United States Patent [19]

Bennett

[11] Patent Number: 5,078,913

[45] Date of Patent: Jan. 7, 1992

[54] DEODORIZATION OF AMINE CONTAMINATED QUATERNARY AMMONIUM SALT CONDUCTIVE RESINS

[75] Inventor: Everett W. Bennett, Easthampton, Mass.

[73] Assignee: James River Paper Company, Inc., South Hadley, Mass.

[21] Appl. No.: 337,825

[22] Filed: Apr. 14, 1989

[51] Int. Cl.$^5$ .......................... H01B 1/06; C08F 6/00
[52] U.S. Cl. ................................ 252/500; 528/490; 528/487; 525/340; 525/343
[58] Field of Search ................. 252/500; 528/490, 487, 528/491, 494; 525/340, 343, 379, 374

[56] References Cited

U.S. PATENT DOCUMENTS 4,990,581  2/1991  Pauline ............................. 252/500

Primary Examiner—Josephine Barr
Attorney, Agent, or Firm—Burns, Doane, Swecker & Mathis

[57] ABSTRACT

A method for removing odor from an aqueous solution of polymeric quanternary ammonium salt solution containing residual aliphatic tertiary amine and choline chloride or derivative thereof, said process comprising adding a sufficient amount of a non-volatile, stable, polybasic acid to react with said choline chloride or derivative thereto to prevent the formation of aliphatic tertiary amine from said choline chloride or derivative thereof. The present invention is also directed to a process for the preparation of recording film by treating as ethylene oxide neutralized conductive quaternary polymer solution with orthophosphoric acid and coating the treated solution directly onto a substrate.

4 Claims, 2 Drawing Sheets

DEODORIZATION OF AMINE CONTAMINATED QUATERNARY AMMONIUM SALT CONDUCTIVE RESINS

FIELD OF THE INVENTION

The present invention is concerned with the passivation or inactivation of odor-causing compounds, particularly amines, in electrically conducting ionic resins. More particularly, the invention involves the addition of a non-volatile, stable, polybasic acid such as phosphoric acid to an aqueous solution of polymeric quaternary ammonium salt ionically conductive resin, especially those whose synthesis involves final pH adjustment with an oxirane.

BACKGROUND OF THE INVENTION

Over the past two decades dielectric recording technology has become firmly established and accepted as a superior means of producing computer generated images on either paper or film based electrographic products. Irrespective of the particular substrate, the product construction is that of a capacitor, as depicted in FIG. 1. The supporting substrate (10) carries an electrically conductive ground plane (12) which is overcoated with a thin dielectric resin layer (14) designed to hold an electrostatic surface charge in an imagewise pattern as depicted in FIG. 1. The supporting substrate is typically paper or plastic. Of the several techniques practiced for coating a ground plane, e.g., sputter deposited semiconductive metal oxides such as indium doped tin oxide, vacuum deposited aluminum, salts of sulfonated low molecular weight polystyrene, or quaternary ammonium salts derived from chloromethylated low D.P. (degree of polymerization) polystyrene, the quaternary salts offer advantages in cost, as well as production simplicity and some advantageous physical properties are obtained also. Unfortunately, in the synthetic process used to manufacture the polymeric quaternary salts, it is inherent that small but objectionable amounts of malodorous trimethylamine may be left in the produce solution. Kirk-Othmer *Encyclopedia of Chemical Technology*, third edition, John Wiley and Sons, NewYork, N.Y. (1979), Vol. 6, p. 20.

That amine contaminant arises from the final step in the synthesis which is neutralization of excess acid generated as a by-product due to chloromethyl group solvolysis concurrent with the quaternization reaction. Trimethylamine is a principal component of the odor of spoiled fish. *Can J. Microbiol.*, Vol. 20, p. 1754 (1974).

The synthesis of the quaternary conductive resin is set forth below.

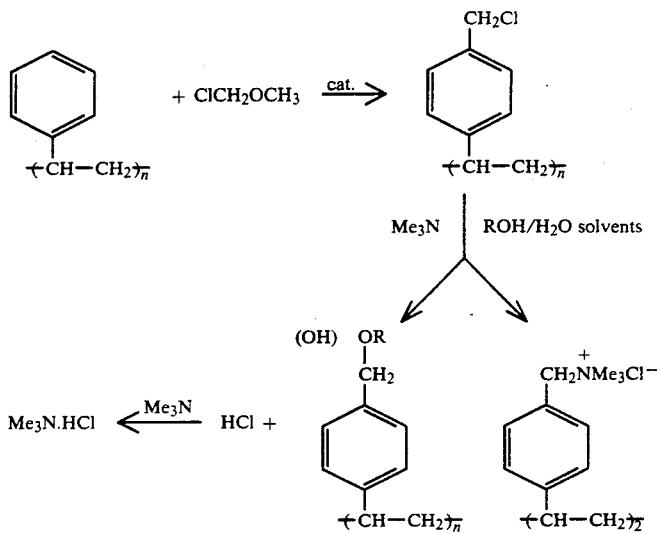

Neutralization of the amine hydrochloride and any excess acidity with inorganic bases such as sodium or calcium hydroxide introduces metal salts that can crystallize. These crystals introduce optical and dielectric defects into the dried ground plane coating. Thus, it has been necessary to adopt another means of removing the excess acidity from the conductive resin solution. The technique chosen at the present time appears to be reaction of the hydrogen chloride (in addition to any amine hydrochloride) with an oxirane, specifically ethylene oxide, to form an appreciable quantity of choline chloride (up to 1 wt. %) which has been identified unequivocally via thin layer chromatography as well as GC-MS analysis. Moosnick et al, *J. Clin. Invest.*, Vol. 24, p. 278 (1945).

These neutralization reactions are set forth below:

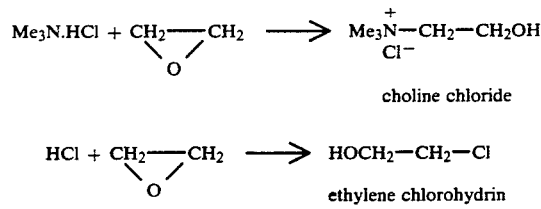

Despite efforts to remove residual free amine from the resin, its odor can generally be detected over the coated product. These trace quantities of free amine are undesirable because the dielectric imaging products constructed using the conductive resin retain the malodor. Obviously there is a great need for a simple and efficient technique for eliminating the malodor of the recording film.

It is recognized that as a genus, the tertiary amines, e.g., trimethylamine, which are generally used to prepare the quaternized resins have a relatively limited chemistry, i.e., there are few reactions characteristic of that genus. Those reactions typically include oxidation, quaternization, cleavages, and radical abstractions. Of these reactions only quaternization involves conditions considered acceptable for a "clean-up" process for aqueous solutions of quaternary salt polymers.

Already a number of possible means of removing the objectionable trimethylamine odor from electrographic products have been investigated including masking those products with a perfume-like fragrance, attempted purification of the resin via molecular sieve treatment, ion exchange resins, vacuum devolatilization and, precipitation and washing. No approach has been entirely successful.

The difficulty intrinsic in the deodorization is probably best understood by recognizing that the threshold level for nasal detection of trimethylamine is approximately 0.00021 ppm. Karel Vershueren, *Handbook of Environmental Data on Organic Chemicals*, second edition, Van Nostrand-Reinhold.

In light of the aforegoing explanation and the unsuccessful attempts of the prior art at masking or removing the odor, it now seems likely that the origin of the malodorous amine may be more complex than previously thought since choline salts are described as having an amine odor (Kirk-Othmer, supra) and are known to decompose under various conditions to generate either trimethylamine (Kahane et al, *Biochimie de la Choline et de ses Derives*, Hermann, Paris (1938)) or N,N-dimethyl ethanolamine. Recognizing this, it has become apparent to the present inventor that the ideal deodorization technique must not only remove trimethylamine but also prevent its slow generation in-situ from a latent source such as choline chloride.

SUMMARY OF THE INVENTION

Surprisingly, the present inventor has discovered a unique way to utilize a quaternization reaction to completely remove the undesirable amine odor from polymeric quaternary ammonium salts, in particular, those salts whose excess acidity was neutralized with an oxirane. The technique of the present invention involves addition of a non-volatile, stable, polybasic inorganic acid, preferably orthophosphoric acid, to the aqueous conductivizing resin solution prior to coating and drying on a substrate.

DESCRIPTION OF THE PREFERRED EMBODIMENTS

Figure 1:
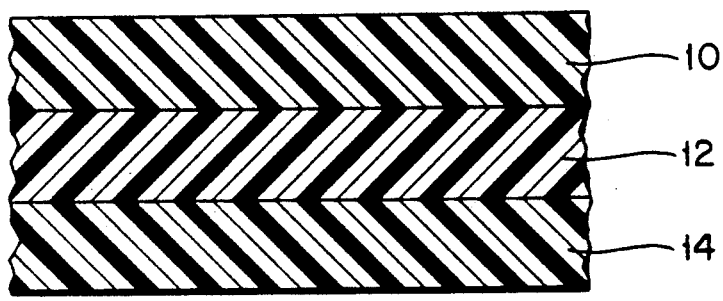
FIG. 1 is a cross-section of the capacitor-type product construction used in dielectric recording technology.

Quaternary ammonium salt conductivizing resin solutions containing residual aliphatic tertiary amines may be deodorized by the process of the present invention. The aliphatic component typically may range from $C_1$ to $C_{10}$ straight or branched chain alkyl. The preferred aliphatic tertiary amine is $C_1$ alkyl, i.e., trimethylamine. Choline chloride may be present along with the tri-methylamine. A derivative or corresponding compound to choline chloride may be present if the aliphatic component is other than a methyl group. The choline chloride or derivatives thereof may be depicted as

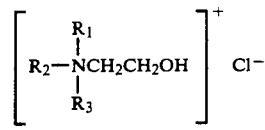

where $R_1$, $R_2$ and $R_3$ typically represent $C_1$ to $C_{10}$ branched or straight chain alkyl, $C_2$ to $C_{10}$ branched or straight chain alkenyl, or $C_3$ to $C_{12}$ cycloalkyl. Preferably, $R_1$, $R_2$ and $R_3$ are $C_1$ to $C_{10}$ straight chain alkyl. Suitable ammonium salt conductive resins include those prepared from a volatile amine by a process utilizing an oxirane to effect final pH adjustment. A specific example would be Chemistat 5500B manufactured by Sanyo Chemical Industries Ltd. or Sanyo Kasei Kogyo Co. Ltd.

A wide variety of oxiranes may be utilized to effect the final pH adjustment including both alkylene and aralkylene oxides such as propylene oxide, ethylene oxide, butylene oxide, cyclohexene oxide, styrene oxide and the like. Such oxiranes are well-known to those of ordinary skill in the art.

The present inventor has also developed a novel process for preparing an essentially odor-free conductive resin. The process comprises (a) reacting approximately a chemically equivalent amount, i.e., stoichiometric amount of an aliphatic tertiary amine with a low molecular weight chloromethylated polystyrene in the presence of a solvent at a temperature of about 20° to 80° C.; (b) adding a sufficient amount of an oxirane to react with residual hydrochloric acid formed in step (a); and (c) adding a sufficient amount of a non-volatile, stable, polybasic acid to react with the choline chloride or homologue thereof formed in step (b) to prevent the formation of aliphatic tertiary amine from the choline chloride or homologue thereof. The low molecular weight chloromethylated polystyrene compounds are well-known to those of ordinary skill in this art. Excess aliphatic tertiary amine may be added if desired.

The synthesis of Chemistat 5500B resin, for instance, is believed to be a conventional alkylation of trimethyl-amine by a low molecular weight chloromethylated polystyrene performed in an alcohol or aqueous alcohol medium. The reaction may be set forth below:

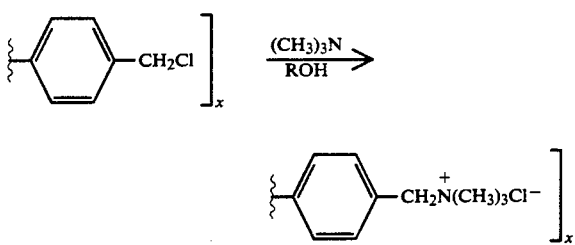

Concurrent with the quaternization reaction is a minor solvolysis reaction that generates hydrochloric acid as set forth below:

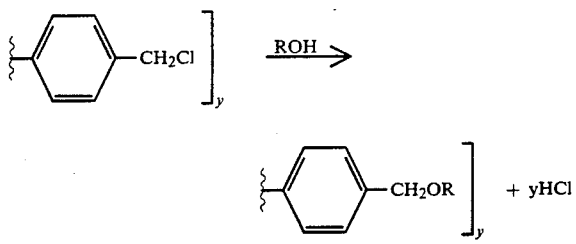

Obviously, since the solvolysis reaction is a parallel reaction to the quaternization reaction the hydrogen chloride generated forms a hydrochloride salt with some of the trimethylamine present.

A final pH adjustment of the product using a base such as sodium hydroxide or calcium hydroxide to scavenge excess acid is not viable because the metal salts thus formed will crystallize in the product coatings and result in both optical and dielectric defects. Apparently at least one manufacturer has attempted to overcome this problem by reacting excess hydrochloric acid with an oxirane, specifically ethylene oxide, to form the neutral, liquid, water soluble, organic molecule ethylene chlorohydrin as set forth below:

The reality of the ethylene oxide treatment was discovered while attempting to develop a reliable analysis for the quantity of residual trimethylamine contaminant by adjusting the pH of the resin solution to about 12 to insure that all residual tertiary amine was free. Gas chromatography detected the presence of ethylene oxide after basification but not before, clearly suggesting an oxirane precursor sensitive to base. Experience immediately suggested the presence of ethylene chlorohydrin and, further, the possible presence of the latent source of trimethylamine, namely, choline chloride. The pertinent reactions are depicted below:

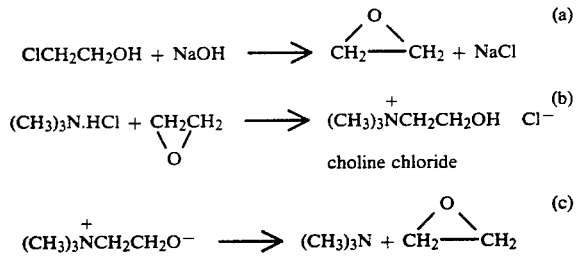

The presence of choline chloride is consistent with the known synthesis of that molecule as set forth in Kirk-Othmer, *Encyclopedia of Chemical Technology*, Third Edition, vol. 6, page 22 (see equation (b) above). Both the chlorohydrin and choline salt were subsequently identified by gas chromatographic-Mass Spectral (GC-MS) analysis. It is also to be noted according to Kirk-Othmer, supra, that choline itself, i.e., the trimethyl (2-hydroxyethyl) ammonium hydroxide formed upon alkalinization of a choline chloride solution is also known to decompose to yield ethylene oxide since ethylene glycol and polyethylene glycols have been identified as decomposition products along with the pseudo-Hofmann decomposition product, trimethylamine. Kahane et al, supra. That decomposition mode is shown in reaction (c) above.

It is now believed by the present inventor that most, if not all, trimethylamine present at the completion of the conductive resin synthesis is converted via the ethylene oxide "neutralization" to choline chloride thus providing a substantial quantity of "latent" tertiary amine awaiting release via a pH change or slow spontaneous decomposition. Here again it is to be noted that Kirk-Othmer describes choline chloride as "usually with a slight odor of trimethylamine."

The present inventor has discovered a unique way to simultaneously cope with the several possible sources of objectional odor existing in the afore-described quaternary ammonium salt resin solutions, i.e., free tertiary amine and decomposition products of choline chloride. The odor elimination is based on a novel use of a non-volatile, stable, polybasic inorganic acid, preferably orthophosphoric acid. The amount of the non-volatile, stable, polybasic inorganic acid useful in the process of the present invention is simply an amount sufficient to react with the choline chloride or derivative thereof and thereby prevent the formation of aliphatic tertiary amine. Since the aliphatic tertiary amine is primarily responsible for the malodor, a substantial decrease in malodor results.

While not wishing to be bound by any theory, it is postulated that the treatment of the Chemistat solution containing choline chloride with a stoichiometric excess (over choline chloride) of orthophosphoric acid results in replacement of the chloride gegen ion with a phosphate ion with the result that neither demethylation nor reversion via the alkoxide mediated pseudo-Hofmann elimination can occur readily due to the low nucleophilicity of phosphate anion in the former case and an intramolecular hydrogen bond in the latter case, e.g.,

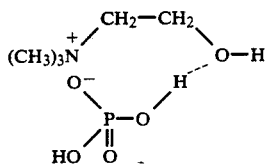

Model solution experiments using authentic choline chloride with and without added phosphoric acid were analyzed for the choline chloride content by an accepted technique based on its known decomposition to dimethylethanolamine. Using thermolysis and gas chromatography the acid treated aliquot of the known solution was found to liberate less than 18% of the decomposition product afforded by the control sample. This is a clear indication that the decomposition mechanisms available have been thwarted.

The gegen ion exchange has been unequivocally demonstrated in the laboratory by allowing various inorganic acids to react with authentic choline chloride (approximating conditions in a film of dried conductive resin) while purging the headspace into a silver nitrate solution with a slow stream of nitrogen to detect chloride replacement via precipitation of silver chloride as shown below:

TABLE I

Gegen Ion Exchange With Choline Chloride $[(CH_3)_3\overset{+}{N}CH_2CH_2OH]Cl^- + H_3PO_4 \longrightarrow$ $[(CH_3)_3\overset{+}{N}CH_2CH_2OH]OPO_3H_2^- + HCl\uparrow$ $HCl + AgNO_3 \longrightarrow HNO_3 + \underline{AgCl}$

| Acid | Room Temp. | 70° C. | Precipitate of AgCl |
|------|------------|--------|---------------------|
| HNO$_3$ | no | yes | moderate rate, brown fumes |
| H$_2$SO$_4$ | yes | yes | rapid |
| H$_3$PO$_4$ | slow | slow | slow but steady |

Additional experiments employing thin layer chromatography on model reactions between various acids and authentic choline chloride also revealed interesting differences. Using Eastman silica gel film strips and Dowanol-PM solvent for development it was found that neither 36% hydrochloric acid nor 70.5% nitric acid in three fold excess would completely eliminate the spot due to choline chloride although both 98% sulfuric acid and 85% phosphoric acid eliminated all evidence of choline chloride.

Additional experiments carried out on dilute aqueous quaternary resin solutions known to contain about one weight percent choline chloride showed via GC-MS analysis that the presence of phosphoric acid decreased the GC peak areas of both choline and homocholine thermolysis products. This is a further indication that ion exchange can alter the chemistry of the choline chloride contaminant. Based on several publications relating to the synthetic conditions needed for the efficient esterification of phosphatidic acids with choline (Rosenthal et al, *Tetrahedron Letters*, No. 12, pp. 977–980 (1975), Deroo et al, *Chemistry and Physics of Lipids*, Vol. 16, pp. 60–70 (1976), Witzke et al, *J. Lioid Res.*, Vol. 26, pp. 623–628 (1985) and Ali et al, *J. Orq. Chem.*, Vol. 53, pp. 5547–5549 (1988)) choline as well as the synthesis of phosphorylcholine itself from pyrophosphoric or polyphosphoric acids (Cherbuliez et al, *Helv. Chim. Acta*, Vol. 42, p. 1154 (1959)) it seems unlikely that efficient phosphorylation of the choline chloride contaminant in the conductive resin in question is, in fact, occurring under the conditions employed. However, irrespective of the accuracy of the foregoing rationale, it now becomes all the more surprising but quite apparent from both analytical data and coating trials that orthophosphoric acid treatment can eliminate the undesirable odor from the resin.

Only non-volatile, stable, polybasic acids such as orthophosphoric acid, sulfuric acid, and the like are suitable in the practice of the present invention. In practice, sulfuric acid is not practical since it is rather corrosive toward production equipment. Other strong inorganic acids such as hydrochloric and nitric are not as effective and, in addition, are deemed unsatisfactory since they are either volatile and/or thermally unstable.

A simple acid-base neutralization reaction involving a tertiary amine being quaternized with a proton would be expected to be both simple and efficient but volatile acids are fugitive and given that ammonium salts are known to have small but finite dissociation constants simple protonation does not permanently destroy the objectionable odor. Indeed, an authentic sample of trimethylamine hydrochloride treated with orthophosphoric acid was analyzed by Thermolysis-Gas Chromatography-Single Ion Monitoring Mass Spectrometry with simultaneous flame ionization detection and the trimethylamine was easily detected and identified.

In addition, a free amine such as trimethylamine which boils at 3° C. should be readily removed via sparging or vacuum; however, that has not proven to be feasible.

The ease and simplicity of the present invention readily lends itself to product coating processes such as those used in the recording film industry. It is only necessary to treat an ethylene oxide neutralized conductive quaternary polymer solution with orthophosphoric acid and coat the treated solution directly onto a substrate with no need for additional processing. At the present time, this is the only known means for quickly and economically removing the odor associated with quaternary ammonium resins of this type.

In order to further illustrate the present invention and the advantages thereof, the following specific examples are given, it being understood that same are intended only as illustrative and nowise limitative.

EXAMPLE 1

Addition of Non-volatile Phosphoric Acid to Chemistat 5500B to Eliminate Amine Odor A 100 ml. sample of 32 percent solids Chemistat 5500B aqueous solution was obtained from Sanyo Chemical Industries. For purposes of the present experiment it was assumed that there was no more than one weight percent trimethylamine present in the sample. It is believed that the actual concentration is likely twenty-fold less but an excess of phosphoric acid is desirable to ensure complete odor elimination in the final electrographic product.

Therefore, one gram of trimethylamine (or its equivalent) in 100 ml. of Chemistat solution would represent 0.0169 equivalents of residual amine and require 1.95 grams of 85% orthophosphoric acid ($H_3PO_4$) (i.e., 97.998 g.f.w. ×0.0169 equivalents represents 1.656 grams neat $H_3PO_4$ or 1.95 grams of 85 wt. % solution) to scavenge the odorants present.

The $H_3PO_4$ treated sample of liquid Chemistat 5500B resin solution was then coated onto a film substrate using standard Meyer rod techniques known in the art and subsequently dried at 170° F. for 2 to 3 minutes in a forced draft oven. The coated and dried sample was then evaluated subjectively for odor via nasal detection by several laboratory personnel since that is, in fact, the mechanism by which the malodor is detected in actual product use. No amine odor was detectable. It is believed that nasal detection is about ten thousand times more sensitive than the best current analytical techniques.

To further demonstrate the utility of the deodorization process sample rolls of the above conductivized polyester film having the requisite 1 to 10 megohm/sq. resistivity level at 50% relative humidity were solution topcoated with 0.7 to 1.4 pounds/1000 sq. ft. of either a polyvinylbutyral or polyacrylate based dielectric layer and periodically checked by nasal evaluation over a span of several months and found to be devoid of amine odor even after the additional topcoating and drying process employed to make finished electrographic product.

Since the efficiency of the deodorization process is obviously independent of the end use of the resin solution, it will be immediately apparent to one of ordinary skill in the art that the deodorized resin can be coated and used on a multiplicity of substrates such as: paper, coated papers, plastic paper, polymers including polyesters, polystyrene, polysulfone, polycarbonate, etc. and even normally rigid supports such as glass or ceramics.

EXAMPLE 2

Comparison of Treated and Untreated Samples of Chemistat 5500B for Residual Trimethylamine Content Six samples of 100 ml. of Chemistat 5500B resin were prepared from a single master batch of solution obtained from Sanyo Chemical Industries. Sample No. 1, the control, was not treated in any manner. Sample No. 2 was acidified with hydrochloric acid and then precipitated by pouring into excess acetone followed by filtration and gentle drying. Sample No. 3 served as an analytical control by being doped with 207 ppm. of trimethylamine incorporated as its equivalent, 334 ppm. of authentic trimethylamine hydrochloride. Sample No. 4 was stirred sixteen hours with a sulfonic acid ion exchange resin (Rohm and Haas, Amberlite IR-120(plus), Amberlite IR-118, and Amberlyst-15 were all tried) and then separated from the resin via filtration. Sample No. 5 was vacuum devolatilized in a Luwa spinning disc still. Sample No. 6 was Chemistat 5500B treated with 0.5 wt. percent of phosphoric acid and diluted to about 16% solids with ethanol for a coating trial.

In each case, analysis for trimethylamine was performed on the headspace above the sample solutions after pH adjustment to twelve to insure the presence of free amine. The results were obtained from two analytical laboratories, both using gas chromatography, and although they differed in magnitude due to the difficulty of the analysis, both analytical laboratories showed the same rank order. The results are set forth in Table II.

TABLE II

| Sample No. | Treatment | Trimethylamine in ppm | |
|---|---|---|---|
| | | Lab A | Lab B |
| 1 | Untreated | 40 | 0.2 |
| 2 | Precipitated | 230 | 9.6 |
| 3 | Dope with Me$_3$N · HCl | 420 | 10.7 |
| 4 | Exchange Resin Treated | 24 | 0.7 |
| 5 | Devolatilized | 9 | 0.3 |
| 6 | H$_3$PO$_4$ Treated | None Detected | None Detected |

EXAMPLE 3

Thin Layer Chromatographic Analysis of the Concentrated Reaction of Choline Chloride With 85% H$_3$PO$_4$ The objective of the present example was to characterize the interaction of phosphoric acid with choline chloride under concentration conditions closer to those used in an acid treated Chemistat 5500B groundplane system, i.e., low water content compared to the coating solution itself.

The g.f.w. for choline chloride is 139.63. The g.f.w. for H$_3$PO$_4$ is 97.99. A 91% pure sample of choline chloride was obtained from Chemical Service, Westchester, Pennsylvania. Three times the acid concentration was used. Therefore, approximately 0.15 gram choline chloride was present in the sample and approximately 0.345 gram of 85% H$_3$PO$_4$ was used.

The choline chloride dissolved in the acid with slight warming. The control sample of choline chloride was dissolved in water at room temperature.

Figure 2A:
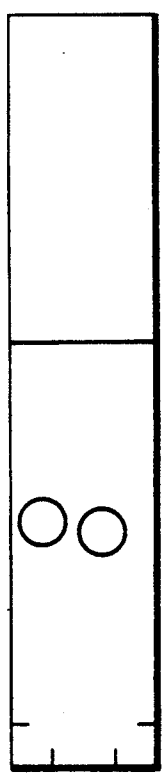
FIG. 2 is a set of chromatograms (a), (b) and (c) developed with Methyl Cellosolve and showing the effect of $H_3PO_4$ on authentic choline chloride (c) versus acid alone (b) and neat choline chloride (a)
Figure 2B:
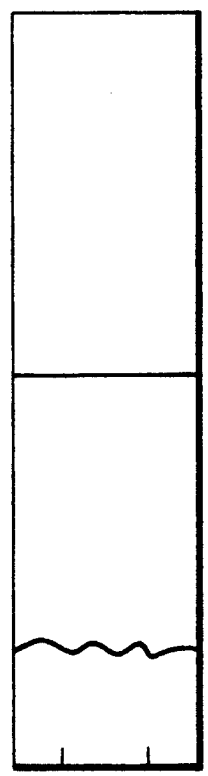
Figure 2C:

Two sets of chromatograms were then developed on Eastman 13179 Silica gel coatings. One set of chromatograms was developed with Methyl Cellosolve as depicted in FIG. 2. Sample (a) on the left was the aqueous choline chloride control. Middle sample (b) was neat H$_3$PO$_4$. Right sample (c) was phosphoric acid and choline.

Figure 3A:
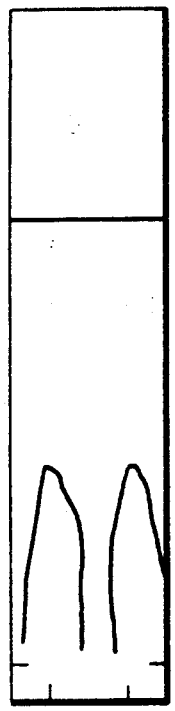
FIG. 3 is a set of chromatograms (a) and (b) developed with Dowanol-PM showing the effect of $H_3PO_4$ on authentic choline chloride (b) versus an aqueous choline chloride control (a).
Figure 3B:
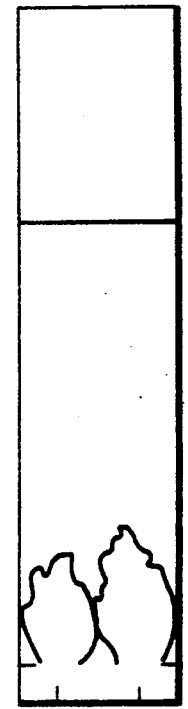

The other set of chromatograms was developed with Dowanol-PM as depicted in FIG. 3. Left sample (a) in FIG. 3 was the aqueous choline chloride control. Right sample (b) was choline chloride and H$_3$PO$_4$. The spots that moved rapidly in the control were not evident in the acid treated authentic choline chloride. Obviously, the material no longer behaved as "free" choline chloride and, in fact, based on the gegen ion exchange experiments, was the phosphate salt which should exhibit a different R$_f$ value (rate of movement versus eluent).

EXAMPLE 4

Thin Layer Chromatographic characterization of Authentic Samples of Choline chloride Treated with Orthophosphoric Acid with and Without Heating the objective of the present example was to show that orthophosphoric acid (H$_3$PO$_4$) not only reacts with choline chloride from a conductive resin but, in addition, that the effect is improved by heating as in the drying of a coated film. Accordingly, some samples were chromatographed on Eastman 13179 Silica gel strips without prior heating while others were held at 72° C. for one hour under 20 mm. pressure before analysis to approximate thin film drying. The results are set forth in Table III:

TABLE III

| Solution | Molar Ratio Acid to Choline Salt | Heated | Developer | R$_f$ Value |
|---|---|---|---|---|
| A | Control-no acid | No | Methyl Cellosolve | 0.50 |
| | Control-only acid | No | Methyl Cellosolve | 0.27 |
| | Reactants-3.0 | No | Methyl Cellosolve | 0.29 |
| | Control-no acid | No | Dowanol-PM | 0.45 |
| | Reactants-3.0 | No | Dowanol-PM | 0.34 |
| B | Control-no acid | No | Dowanol-PM | 0.50 |
| | Dimethyaminoethanol | No | Dowanol-PM | 0.667* |
| | Reactants-3.0 | No | Dowanol-PM | 0.23 |
| C | Reactants-3.0 | 1 hr/ 72° C. | Dowanol-PM | 0.125 |
| D | Reactants-1.0 | 1 hr/ 72° C. | Dowanol-PM | 0.125 |

*Potential thermal decomposition product, see GC-MS analysis for choline chloride.

Since different R$_f$ values (spot movement relative to the developing liquid front) are characteristic of different compounds it is apparent that the treatment, especially with heating, has removed the choline chloride.

EXAMPLE 5

Orthoohosohoric Acid Treatment

This example describes a production coating trial involving Chemistat 5500B resin. A 32 to 33% water solution of Chemistat 5500B coating resin was diluted to approximately 16 to 17 wt. % before coating. Orthophosphoric acid was added to the dilute solution as indicated in the column "Acid Level" in Table IV.

Each solution was then roll coated onto a polyester web, and then dried. Odor was evaluated by nasal detection using approximately four or five people for each sample. The results of the evaluation are set forth in Table IV:

TABLE IV

Deodorization Coating Trials Using Orthophosphoric Acid

| Trial Designation | Acid Level | Nasal Odor Detectable |
|---|---|---|
| A | >2 g/100 g. resin | None |
| B | 0.5 g/100 g. resin | None |
|   | 1.0 g/100 g. resin | None |
| C | 0.5 g/100 g. resin | None |

While the invention has been described in terms of various preferred embodiments, the skilled artisan will appreciate that various modifications, substitutions, omissions and changes may be made without departing from the spirit thereof. Accordingly, it is intended that the scope of the present invention be limited solely by the scope of the following claims.

What is claimed is:

1. A process for removing odor from an aqueous solution of polymeric quaternary ammonium salt solution containing residual aliphatic tertiary amine and choline chloride or derivative thereof, said choline chloride or derivative thereof having the formula

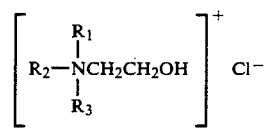

where $R_1$, $R_2$ and $R_3$ typically represent $C_1$ to $C_{10}$ branched or straight chain alkyl, $C_2$ to $C_{10}$ branched or straight chain alkenyl, or $C_3$ to $C_{12}$ cycloalkyl, said process comprising adding a sufficient amount of a non-volatile, stable, polybasic acid selected from the group consisting of orthophosphoric acid and sulfuric acid to react with said choline chloride or derivative thereof to prevent the formation of aliphatic tertiary amine from said chlorine chloride or derivative thereof.

2. The process as claimed in claim 1 wherein said residual aliphatic tertiary amine is trimethylamine and said choline chloride or derivative thereof is choline chloride.

3. The process as claimed in claim 1 wherein said non-volatile, stable, polybasic acid is orthophosphoric acid.

4. A process for removing odor from an aqueous solution of polymeric quaternary ammonium salt containing residual trimethylamine and choline chloride, said process comprising adding a sufficient amount of orthophosphoric acid to react with said choline chloride to prevent the formation to trimethylamine from said choline chloride.

* * * * *